United States Patent
Trevisiol et al.

(10) Patent No.: US 9,405,746 B2
(45) Date of Patent: Aug. 2, 2016

(54) USER BEHAVIOR MODELS BASED ON SOURCE DOMAIN

(71) Applicant: Yahoo! Inc., Sunnyvale, CA (US)

(72) Inventors: Michele Trevisiol, Barcelona (ES); Luca Aiello, Barcelona (ES); Luca Chiarandini, Barcelona (ES); Alejandro Jaimes, Barcelona (ES)

(73) Assignee: Yahoo! Inc., Sunnyvale, CA (US)

(*) Notice: Subject to any disclaimer, the term of this patent is extended or adjusted under 35 U.S.C. 154(b) by 749 days.

(21) Appl. No.: 13/730,305

(22) Filed: Dec. 28, 2012

(65) Prior Publication Data
US 2014/0189525 A1    Jul. 3, 2014

(51) Int. Cl.
G06F 17/30    (2006.01)
H04L 29/08    (2006.01)

(52) U.S. Cl.
CPC .......... *G06F 17/30* (2013.01); *G06F 17/30876* (2013.01); *H04L 67/306* (2013.01)

(58) Field of Classification Search
USPC ........................................................ 715/745
See application file for complete search history.

(56) References Cited

U.S. PATENT DOCUMENTS

| | | | | |
|---|---|---|---|---|
| 6,981,040 B1* | 12/2005 | Konig et al. | | 709/224 |
| 8,225,195 B1* | 7/2012 | Bryar et al. | | 715/206 |
| 2002/0042793 A1* | 4/2002 | Choi | | 707/6 |
| 2003/0063779 A1* | 4/2003 | Wrigley | | 382/116 |
| 2007/0112730 A1* | 5/2007 | Gulli et al. | | 707/3 |
| 2010/0114890 A1* | 5/2010 | Hagar et al. | | 707/737 |
| 2010/0121850 A1* | 5/2010 | Moitra et al. | | 707/737 |
| 2011/0082858 A1* | 4/2011 | Yu et al. | | 707/727 |
| 2013/0031080 A1* | 1/2013 | Vijaywargi et al. | | 707/706 |
| 2013/0132851 A1* | 5/2013 | Konopniki et al. | | 715/736 |
| 2014/0181204 A1* | 6/2014 | Sharp et al. | | 709/204 |

OTHER PUBLICATIONS

F. Benevenuto et al., "Characterizing User Behavior in Online Social Networks", IMC'09, Nov. 4-6, 2009, 14 pages.
M. Gamon et al., "Navigation Patterns From and to Social Media", Proceedings of the Third International ICWSM Conference, 2009, pp. 203-206.
J. Huang et al., "Parallel Browsing Behavior on the Web", Copyright 2010 ACM, Jun. 13-16, 2010, 5 pages.

(Continued)

*Primary Examiner* — Matt Kim
*Assistant Examiner* — Daniel Samwel
(74) *Attorney, Agent, or Firm* — Hickman Palermo Becker Bingham LLP

(57) ABSTRACT

A method for tailoring content in a web page is provided. There is a relationship between the source domain a user comes from and the behavior pattern of a user on a website. To predict the behavior patterns of a particular user coming from a particular source domain, first a large dataset is compiled from user logs. Second, session analysis is performed on the dataset to identify sessions, session characteristics, page view categories, and source categories. Third, sessions are clustered and analyzed to determine how the behavior changes according to a source category. Fourth, a mapping between source categories and behavior patterns is generated. When a user requests a page view from a source domain, if the source domain is mapped to a source category, then a tailored version of the page view is presented to the user based on the mapping between source categories and behavior patterns.

20 Claims, 8 Drawing Sheets

(56) References Cited

OTHER PUBLICATIONS

J. Jiang et al., "Understanding Latent Interactions in Online Social Networks", Copyright 2010 ACM, Nov. 1-3, 2010, pp. 369-386.
Ms. Jyoti et al., "A Novel Approach for clustering web user sessions using RST" International Journal on Computer Science and Engineering, 2009, pp. 56-61.
R. Kumar et al., "A Characterization of Online Browsing Behavior", WWW 2010, Apr. 26-30, 2010, 10 pages.
N. Kushmerick et al., "Towards zero-input personalization: Referrer-based page prediction", 2012, 10 pages.
K. Lerman, "Social Browsing On Flickr", ICWSM 2007, 4 pages.
K. Lerman, "Social Browsing and Information Filtering in Social Media", Oct. 30, 2007, 19 pages.
A. McCallum et al., "Efficient Clustering of High-Dimensional Data Sets with Application to Reference Matching", 2000, 10 pages.
A. Vakali et al., "An Overview of Web Data Clustering Practices," 2005, 9 pages.
M. Valafar et al., "Beyond Friendship Graphs: A Study of User Interactions in Flickr", Copyright 2009 ACM, Aug. 17, 2009, 6 pages.
"Canopy Clustering Algorithm", Wikipedia, available: http://en:wikipedia.org/wiki/Canopyclusteringalgorithm, retrieved Apr. 28, 2013, dated Oct. 2, 2012, 2 pages.
"k-means Clustering", Wikipedia, available: http://en:wikipedia.org/wiki/K-meansalgorithm, retrieved Apr. 28, 2013, dated Apr. 23, 2013, 11 pages.

* cited by examiner

FIG. 1

| | |
|---|---|
| *Display all user photos* <br> Displays the photos of a user on a grid | 26.71% |
| *Browse user photos* <br> Displays full-page photo of a user and allows browsing to the next and previous pictures | 20.67% |
| *Browse user album* <br> Displays full-page photo of an album of a user and allows browsing to the next and previous pictures | 14.12% |
| *Display single photo* <br> Displays full-size photo | 7.22% |
| *Homepage* <br> Home page of Flickr | 5.60% |
| *View user albums* <br> Lists the album of a user | 4.59% |
| *Browse group photos* <br> Displays full-page photo of a group and allows browsing to the next and previous pictures | 2.63% |
| *Search photos* <br> Photo search in Flickr | 2.38% |
| *Browse user fav.* <br> Displays full-page photo of the favorite photos of a user and allows browsing to the next and previous pictures | 2.09% |
| *Group photos* <br> Displays the photos of a group on a grid | 1.79% |

FIG. 2

| pageCategory | Occurrences |
|---|---|
| *search:* search.yahoo.com, google.com, etc. | 34.87% |
| *social:* facebook.com, tumblr.com, etc. | 26.95% |
| *mail:* mail.yahoo.com, gmail.com, etc. | 13.22% |
| *aggregator:* reddit.com, stumbleupon.com, etc. | 7.76% |
| *blog:* blogspot.com, blogger.com, etc. | 6.65% |
| *photo:* flickrhivemind.net, compfight.com, etc. | 2.32% |
| *microblog:* twitter.com, etc. | 2.26% |
| *forum:* discussion forums | 2.00% |
| *news:* news.yahoo.com, cnn.com, etc. | 1.67% |
| *shop:* ebay.com, etc. | 0.85% |

USER BEHAVIOR MODELS BASED ON SOURCE DOMAIN

FIELD OF THE INVENTION

The present invention relates to tailoring the content presented in a web page based on the source domain.

BACKGROUND

Insights into how users behave within a website or domain are extremely important in informing business decisions. For example, having insight on what pages or sections are visited most frequently can be used not just to create better user models, but also to improve the design of such pages and the overall "flow" of the website (e.g., by highlighting certain sections on particular page layouts).

Certain online services, such as Flickr, have become rich resources for research in multimedia. While a lot is known about the data that resides at such online services, there are not that many insights into how people actually use the services, and in particular, their social navigation patterns.

As the functionality of the web has become more complex, sharing content (e.g., photos, comments, documents, etc.) is accomplished in many more ways. For example, people frequently share photos through social networks, blogs, and news articles, etc. Accordingly, it is increasingly more difficult to understand the dynamics of how users browse and consume content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and which:

FIG. 1 illustrates the ten most visited page view categories in a particular dataset (the "Example Dataset");

FIG. 2 illustrates the most frequent source categories from which users arrive to Example Service pages and some examples of source domains that belong to each source category, in the Example Dataset;

DETAILED DESCRIPTION

Figure 3:
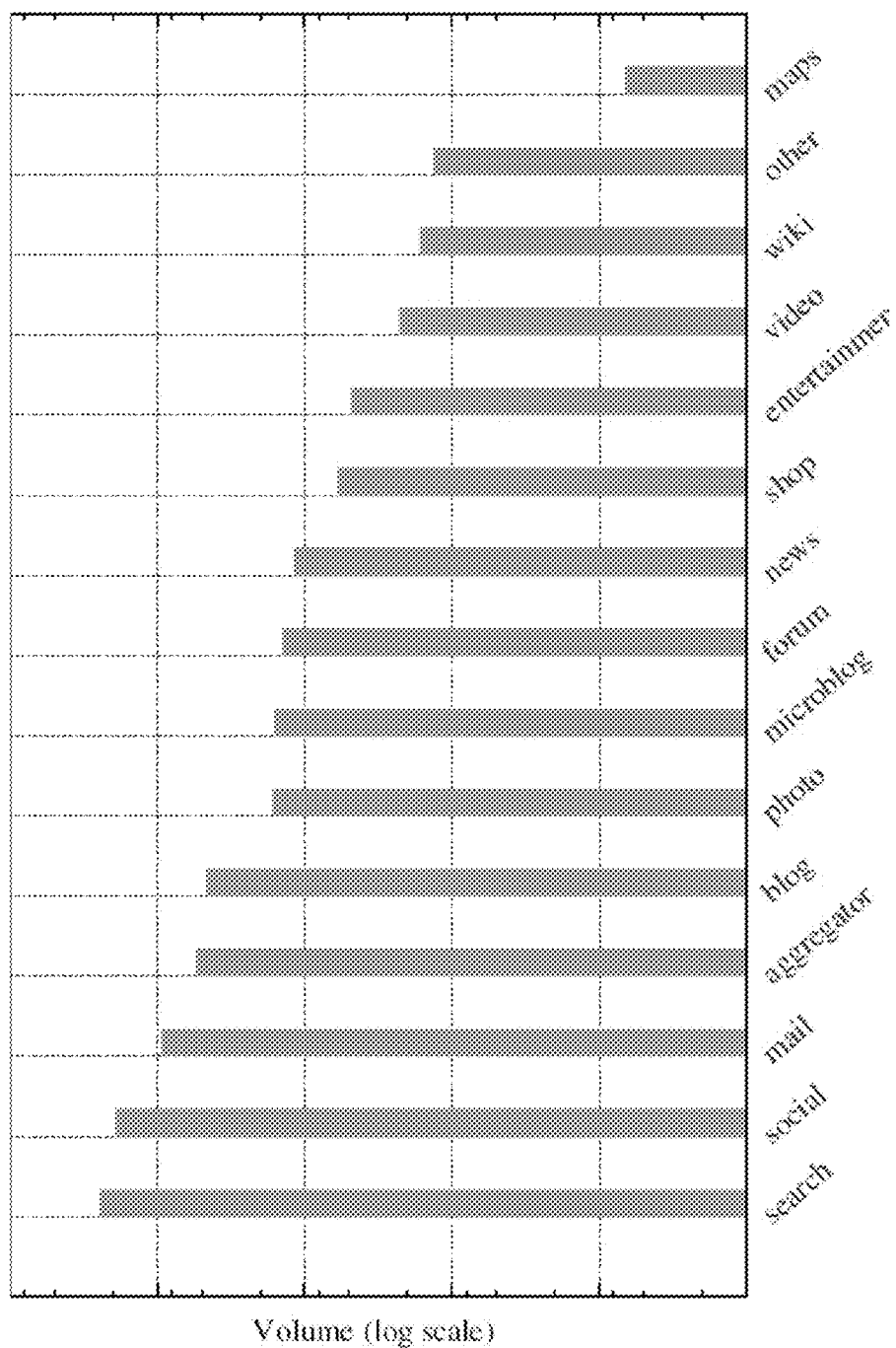
FIG. 3 is a histogram that illustrates the distribution of the source categories in the Example Dataset.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Using browsers, users navigate from one page to another. When a user navigates from one page to another, the page the user navigated from is referred to as the "source" page, and the page to which the user navigates is the "target" page. The domain to which the source page belongs is referred to as the "source" domain. The domain to which the target page belongs is referred to as the "target" domain.

It has been discovered that there is a relationship between the source domain, or the type of information network associated with the source domain, from which a user navigates, and the navigation behavior of the user within the target domain. Described herein are methods for customizing a website user's experience within the target domain based on the source domain from which the user entered the target domain. Insights into how users behave within a website or domain are extremely important in informing business decisions.

To predict the behavior patterns of a particular user coming from a particular source domain, information is compiled about the source domains from which users entered a particular target domain, and how those users behaved within the target domain. A mapping is then established between source domains (or categories of source domains) and behavior patterns. When a user from a particular source domain requests a particular page view within the target domain, a tailored version of the page view is presented to the user based on the mapping between source domains/categories and behavior patterns.

Dataset Collection

The page view records from a particular website (the target domain) constitute a dataset. The page view dataset comprises information regarding source domains, and behavior patterns. The page view dataset can be quite large. For example, a page view dataset may comprise page view records from millions of user requests over months of traffic. Each page view record may include several fields. For example, each page view record may include, but is in no way limited to, the fields: source domain, unique user identifier, requestor IP address, timestamp, page view URL, and user-agent. Page view categories, source categories, sessions, and session-clusters may be determined from the page view dataset, as shall be described in greater detail hereafter.

Page View Filtering

Various filters can be applied to remove page view records from consideration that do not reflect the behavior of users for which the website desires to provide customized views. For example, the website may desire to provide customized page views only to users within a particular geographic region. Under these circumstances, the page view records of users outside a particular geographic region or time zone may be filtered based on the location of IP address that the HTTP request is coming from.

As another example, behavior of web crawlers does not necessarily reflect actual user behavior. Thus, behavior prediction improves by filtering out page view records associated with web crawler traffic. Traffic from web crawlers may be filtered out based on a comparison between the user-agent information in each page view record and a list of recognized web browsers or rendering engines. For example, if the user-agent field associated with a page view contains "Firefox," "Chrome," "Safari," "Mozilla," or "AppleWebKit," then the page view may be retained. If, however, for example, the user-agent was "spider" or "googlebot," then the page view record may be removed from the dataset.

In some cases, even when the user-agent appears to be a legitimate browser or rendering engine, the frequency of requests may suggest that the requestor is a "bot" (not a human), and therefore should be filtered out of the page view dataset, since the dataset is to be used for human behavior prediction. To filter out such page view records, a maximum threshold on the total number of page views per user may be established. If the total number of page views by a user exceeds the maximum threshold, then those page views may be discarded. The threshold may be set so that only a small percentage of any bot's page views are considered.

Page View Categories

In one embodiment, pages of the target domain are grouped into "page view categories". Each page view category corresponds to a different user intent, and includes the pages that would be of interest to users with the corresponding intent. For example, assume that the target domain is the web site of Example Service, which allows users to store and share photos. In this context, one page view category may include pages of interest to users who want to see the photos of a particular individual, and another page view category may include pages of interest to users who want to browse photos that include specific subject matter.

The layout of a page that a user requests often reflects the intent of the user. Thus, a user that requests a page that shows one photo typically has a different intent than a user that requests a page that is filled with a group of photos. Consequently, one way to determine a user's behavior may be based on the layout of the pages, within the target domain, that the user requests. According to one embodiment, URLs that refer to pages that have the same layout are treated as belonging to the same page view category.

In most websites, multiple URLs can map to exactly the same page layout. For example, within Example Service, the URL of a page that shows a single image may contain a unique ID for the image. Consequently, two web pages with the same page layout, but with different images, will have different URLs even though the page layout is the same.

In one embodiment, the page view categories are defined by a hierarchical taxonomy of page view URLs. A manually created set of regular expressions may classify the page view URLs to obtain any number of different page view categories. For example, some page view categories may include, but are in no way limited to, "display all user photos," "search photos," "browse group photos," "add contacts," or "accept invitation to join." Other embodiments may use other attributes of the page view URL or page view record to create page view categories.

Source Categories

A source category is a group of source domains, in which each source domain in a source category belongs to the same genre, topic, functionality, or other various attributes. Preferably, source domains are grouped into source categories such that the behavior of users coming from one source domain in a given source category is similar to the behavior of users coming from the other domains in the source category. In other words, if source domain A and source domain B are both members of source category X, then ideally users from source domain A will exhibit similar behavior in the target domain as will be exhibited by users from source domain B.

For example, source categories may include, but are in no way limited to, search, social, mail, blog, microblog, photo, forum, news, and shop. The "search" source category may include source domains of various search services; the "social" source category may include source domains of various social network services, etc.

In order to determine the category of the source domain a user came from the source domains may be assigned to source categories automatically or manually. The domain-to-category assignment may be based various attributes, including, but in no way limited to, the global top-level domain, subdomain, full URL, content presented to a user, type of information a user submits, genre, topic, functionality, or some combination thereof.

Source domains may be categorized automatically using libraries, e.g., Open Directory Project or Yahoo! Directory. For example, Yahoo! Directory lists websites by topic. In one embodiment, source domains could be categorized by looking up a particular domain in Yahoo! Directory and grouping the source domain by the topic defined in Yahoo Directory.

Source domains may be categorized manually. In some cases automatic categorization may be too detailed or inaccurate, thus it may be preferred to categorize source domains manually. Furthermore, in some cases, only certain categories may be important, thus only a subset of source domains are placed in one or more particular source categories and the rest may be excluded.

Session Extraction and Analysis

After the filtered page view dataset is compiled, information about individual sessions are extracted from the dataset. A session is a series of interactions of a particular user within the target domain over a relatively contiguous time interval. Thus, if a user navigates to the Example Service, navigates to several pages within the website, and then logs off, the page view records generated when the user visited those pages collectively reflect a single session of the user. If the user then returns to the Example Service the following day and navigates to a second set of pages, the page view records generated when the user visited the second set of pages constitutes a second session. Traditionally, in each session, a user's behavior is assumed to be oriented towards a single goal.

The amount of time that must elapse between a user's page views before a subsequent page view is considered to start a new session may vary from implementation to implementation. For example, if twenty-five minutes elapse between a first page view and a second page view, for a particular user, then the first and second page views may be considered to be the end of a first session and the beginning of a second session, respectively.

Time may not be the only factor in determining boundaries between sessions. Specifically, user activity may be split into sessions based on the user identifier, timestamp of the page view, source domain, any combination of the three, or many other factors. In one embodiment where source domain is a factor in determining session boundaries, if a particular user requests a first page view that has a first source domain, and the same particular user requests a second page view, that has a second source domain, then the two page views may be considered to be the end of a first session and the beginning of a second session, respectively.

Session and Source Category Characteristics

For the purpose of explanation, an example shall be given in which two months of page view records from Example Service (the "Example Dataset"). The Example Dataset included 40,446,676 sessions from 10,912,431 unique users.

FIG. 1 illustrates the ten page view categories that have the most page views in the Example Dataset. Although 96 page view categories were defined in the Example Dataset, users primarily navigated through pages that correspond to a small subset of the defined page view categories. Further, in any given session, users tended to visit pages associated with only a few page view categories. On average, each session involved visiting pages from 1.83 distinct page view categories.

Specifically, FIG. 1 illustrates that 26.71% of all sessions in the Example Dataset involved visits to pages that fall into the "Display all user photos" page view category. Pages that fall into the "Browse user photos" page view category were visited in 20.67% of the sessions, etc. Pages that fall into the page view categories that are not illustrated in FIG. 5 were visited in less than 1.79% of all sessions.

FIGS. 2 and 3 are also derived from the Example Dataset. FIG. 2 illustrates the most frequent source categories from which users arrive to Example Service pages and some examples of source domains that belong to each category. FIG. 3 is a histogram that illustrates the distribution of the source categories in the Example Dataset.

In the illustrated example, the two most common source categories are "search" and "social". The "search" source category includes sites where users are able to submit image search and navigational queries. The "social" source category includes social network websites, such as Facebook, which constitute very popular access points since users are highly interested in photos shared by friends. The fact that many sessions come from the news domain is indicative that an image is often considered as appealing or significant as the actual text of the article.

Session-Clusters

A session-cluster is group of similar sessions. Session-clusters are useful for discovering groups of users exhibiting similar behavior patterns. Accordingly, in one embodiment, after the sessions are extracted, the sessions are grouped into session-clusters, such that the sessions in a session-cluster are similar. The session-clusters are then used to map source categories to page view categories, or behavior patterns.

Modeling Sessions

In one embodiment, to generate session-clusters, each session is modeled as a vector, $v=(v1, v2, \ldots, vP)$. Each element, vi, represents the number of page views requested from each page view category, i, during the session. For example, during a session s the user may have viewed two pages, which both correspond to a single photo page. If the forth element, v4, represents the page view category "Display Single Photo" then the session-vector that represents s includes elements v1 through vP, such that v4 equals 2 and all the other elements, v1 through v3 and v5 through vP, equal zero.

Clustering Sessions

The session-vectors are then grouped into clusters. Session-clusters may be determined based on any number of clustering algorithms. For example, session-clusters may be determined based on a canopy clustering algorithm, a K-means algorithm, or a combination of the canopy clustering algorithm and the K-means algorithm. Furthermore, any distance metric may be used to by clustering algorithms to compute the distance between two session-vectors. For example, a cosine similarity or a Euclidian distance metric may be used.

The canopy clustering algorithm is a fairly efficient algorithm, and may even be used as an initial step for another clustering algorithm. Canopy clustering requires two threshold values, T1 and T2, such that T1 is greater than T2. Each session-vector is compared with every other session-vector. If distance between two session-vectors is less than T1 and greater than T2, then the two points are in the same cluster. In some embodiments, the session-vectors are normalized before computing the distances. Using canopy clustering, a session-vector may exist in more than one cluster.

The K-means algorithm is an iterative method which takes a set of seed vectors and a set of session-vectors as parameters. On the first iteration, the seed vectors are assumed to be the centroid of each cluster. Each session-vector is assigned to a cluster with the closest centroid. On the second iteration, new centroids are determined, such that the new centroid of each session-cluster is the mean of all the session-vectors in each session-cluster, respectively, and each session-cluster is assigned to the closest new centroid. The second iteration may be repeated several times. After one or more iterations, the system converges such that no session-vector in any session-cluster is moved to another session-cluster. Using a K-means algorithm, a session-vector may not be assigned to more than one cluster.

Many methods can be used to determine the seed vectors for the K-means algorithm. In one embodiment, the seed vectors for the K-means algorithm are the computed centroids for each cluster derived from canopy clustering. In another embodiment, the seed vectors are based on model vectors determined manually. Other embodiments may use other methods of determining the seed vectors.

Distance Metrics

The clustering algorithm may use any one of a numerous possible distance metrics, e.g., cosine similarity or Euclidian distance. Cosine similarity may be a particularly effective distance metric for clustering, because it is not affected by the absolute number of page views, it is only affected by the relative distribution across the page view categories. For example, suppose there two session-clusters, and each session-cluster has a centroid, $c1=(1, 0, 0, \ldots, 0)$, and $c2=(0, 1, 0, 0, \ldots, 0)$, respectively. Further suppose that there is a session-vector defined as $s1=(0, 7, 3, 0, 0, \ldots, 0)$. The normalized centroids are $c1=(1, 0, 0, \ldots, 0)$; $c2=(0, 1, 0, 0, \ldots, 0)$ respectively; and the normalized $s=(0, 0.7, 0.3, 0, 0, \ldots, 0)$. To compute the cosine similarity between c1 and s, the inner product is calculated using normalized c1 and normalized s, which in this case is zero. To compute the cosine similarity between c2 and s, the inner product is calculated using normalized c2 and normalized s, which in this case is 0.7. Since the cosine similarity between c2 and s is greater than the cosine similarity between c1 and s, s determined to be closer to c2 and s is assigned to the second session-cluster.

Exemplary Method for Session-Clustering

Figure 4:
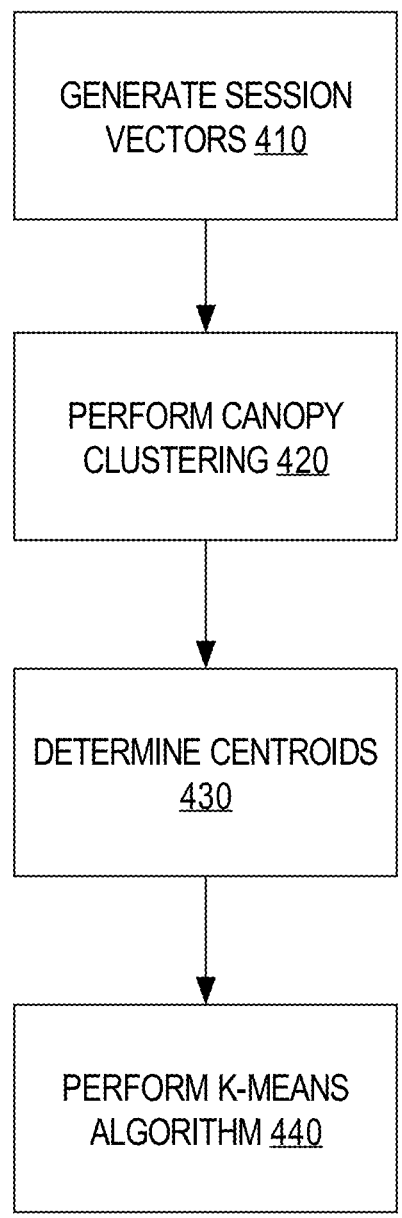
FIG. 4 is a flowchart that illustrates sessions being grouped into session-clusters, according to one embodiment.

To exemplify the principles and methods discussed above, FIG. 4 is a flowchart that illustrates sessions being grouped into session-clusters, according to one embodiment. While FIG. 4 illustrates steps according to one embodiment, other embodiments may omit, add to, reorder, and/or modify any of the steps shown. In step 410, a session-vector is generated for each extracted session. In step 420, a number of initial session-clusters are determined based on canopy clustering, using cosine similarity as the distance metric. In step 430, a centroid is computed for each session-cluster, such that each centroid is the mean of each session-vector in each session-cluster, respectively. In step 440, the session-clusters generated in step 420 are refined based on a K-means algorithm, using the centroids generated in step 430 as seed vectors, and using cosine similarity as the distance metric.

Understanding Frequent Navigation Patterns

As discussed above, the overall behavior of the user in the site may be predicted based on the source category, and thus the source domain. Based on the session-clusters determined in the previous section, the contribution of each source category for each session-cluster is analyzed. First, session-clusters that show standard navigation patterns that are independent from the initial context are determined. In other words, session-clusters that are uniformly distributed across all source categories ("SCs") may be eliminated. In one embodiment, to determine which session-clusters show standard navigation patterns that are independent, an entropy distribution is computed for each session-cluster c across the probability distribution function p(c|SCs) with:

$$\sum_{SC} [p(c \mid SCs) \log_2 p(c \mid SCs)]$$

The session-clusters with the highest entropy distributions are used in further analysis. In other words, if the session-clusters are sorted in ascending order, the top session-clusters are used for further analysis. Alternatively, other entropy functions may be used. In one embodiment the session-clusters with an entropy over a particular threshold are selected. In another embodiment, a particular number of session-clusters are selected based on the number of session-clusters that are required to span the page view categories. Other embodiments may use other entropy functions to determine how independent the standard navigation patterns are for each session-cluster. Furthermore, other methods of selecting the top session-clusters may be used.

Figure 5:
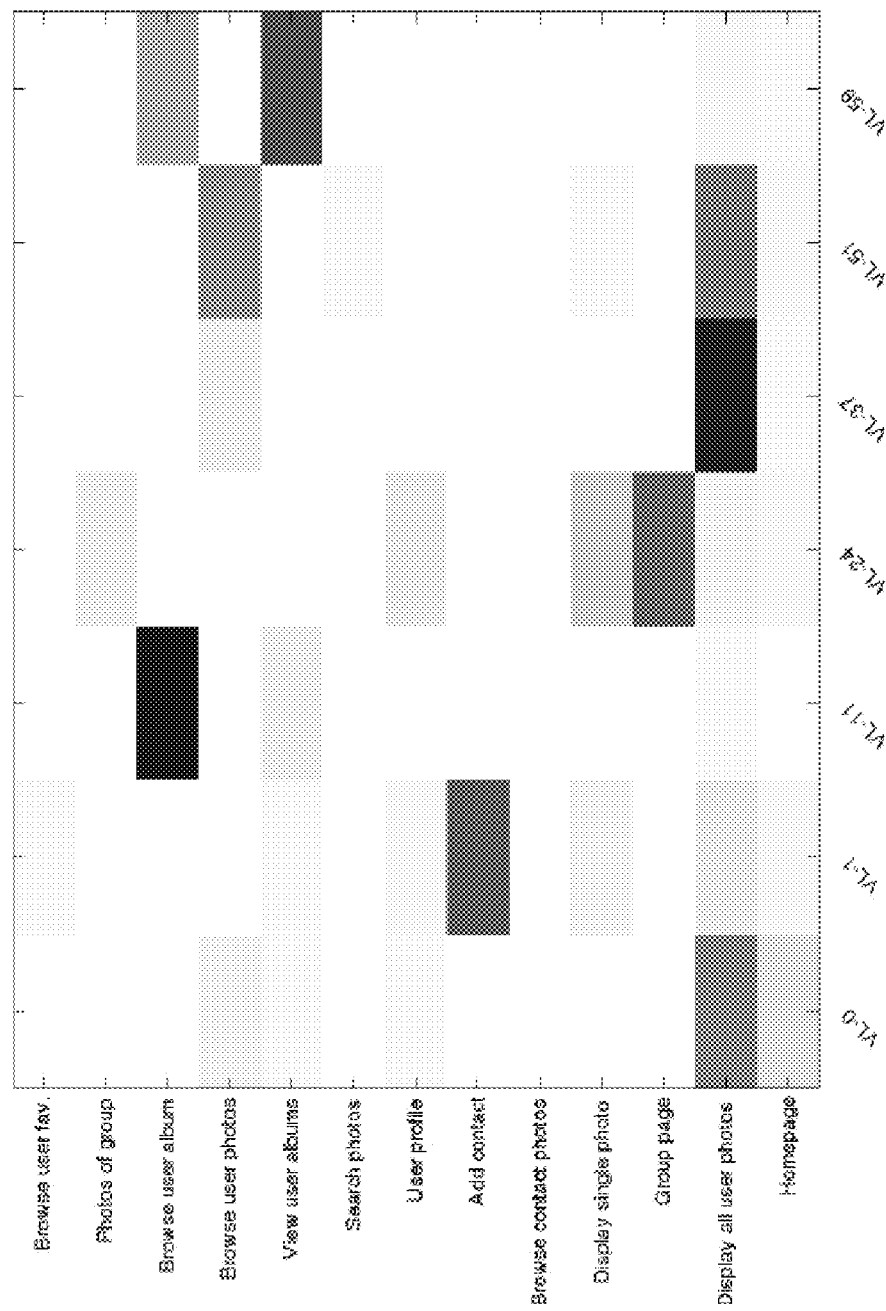
FIG. 5 is a heat-map, which illustrates the top seven session-clusters based on an entropy calculation, in the Example Dataset.

FIG. 5 is a heat-map, which illustrates the top seven session-clusters based on an entropy calculation, in the Example Dataset. The session-clusters are normalized and given a shading based on the contribution of the relative page view category in each session-cluster, respectively. A darker square indicates a higher contribution of the relative page view category (row) in the current session-cluster (column). Since the session-clusters correspond to widespread behavior patterns, the underlying navigation pattern may be easier to understand, as illustrated in FIG. 5. For example, session-clusters VL-0, VL-37 and VL-51 contain a high contribution in the "Display all user photos" row and the "Browse user photos" row, which corresponds to the behavior of browsing through the photos of a user. Session-cluster VL-1, on the other hand, contains a high contribution in the "Add contact" row, which corresponds to the behavior of importing and adding new contacts. Session-cluster VL-11 contains a high presence in the "Browse user album" row, which corresponds with browsing photo albums. Session-cluster VL-59 shows a similar behavior where the sessions are more balanced between browsing a particular album ("Browse user album" row) and seeing the list of albums ("View user albums" row), perhaps to explore a different album. Group-oriented navigation is distinctive in session-cluster VL-24, due to a high contribution in the "Group page" and "Photos of group" rows, where users are switching between the a group's main page and the group's photos.

Associating Source Domains with Behavior Patterns

As stated above, many session-clusters illustrate distinct browsing behavior patterns. A few well-picked session-clusters show how well a session-cluster can describe particular behavior patterns in relation to source categories.

Figure 6:
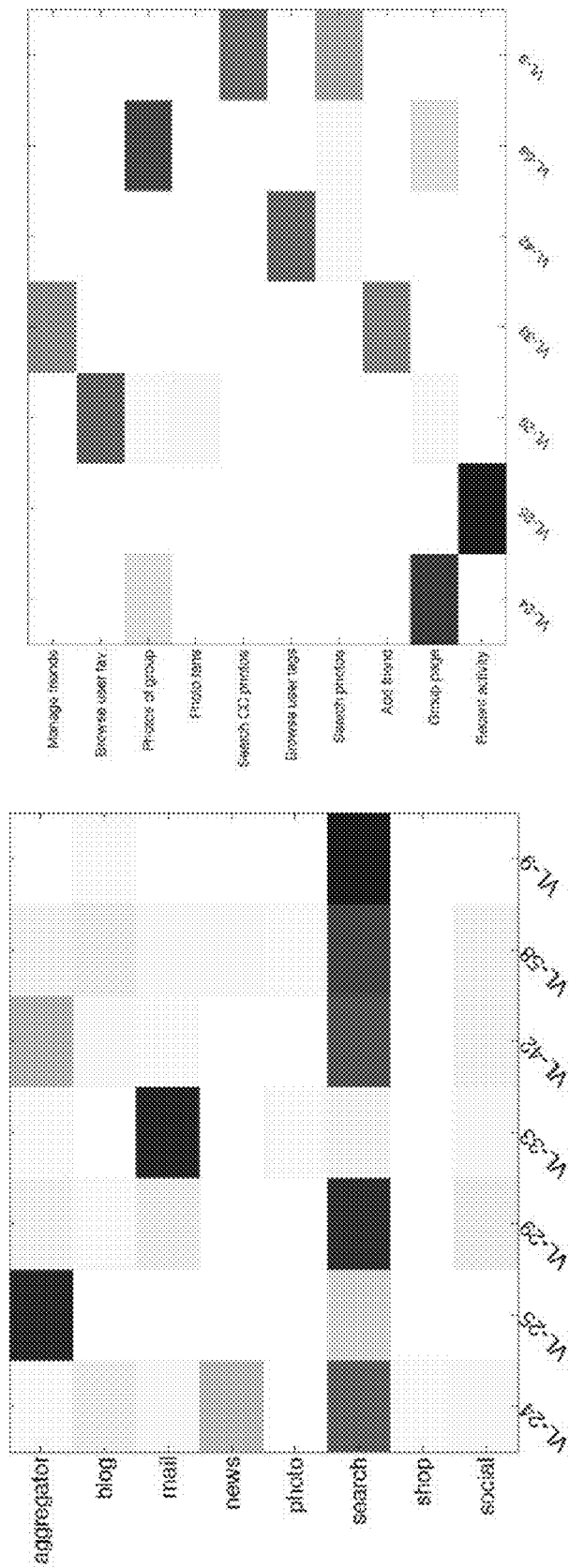
FIG. 6a illustrates a distribution of select session-clusters across source categories, in the Example Dataset.
FIG. 6b illustrates the distribution of the same select session-clusters in FIG. 6a across page view categories, in the Example Dataset.

FIG. 6a illustrates a distribution of select session-clusters across source categories, in the Example Dataset. FIG. 6b illustrates the distribution of the same select session-clusters in FIG. 6a but across page view categories, in the Example Dataset. Due to the large amount of sessions originating from search engines, the search source category appears in most of the session-clusters, however, there are still other very distinctive behavior patterns.

For example, session-cluster VL-24 shows a large contribution in the source category "News" (FIG. 6a, forth row, first column). Session-cluster VL-24 also shows a large contribution in the page view categories "Photos of group" and "Group page" (FIG. 6b, third and ninth rows, respectively, first column), which corresponds to browsing group pictures and pictures on the group home page. This relationship indicates that news editors embed groups of images into the article page. Moreover, photos of the same event are likely to be organized in the same group in Example Service. Thus, it is more likely that users that have a source domain categorized as "News" are interested in browsing group pictures and pictures on the group home page.

Session-cluster VL-25 shows a large contribution in the source category "Aggregator" (FIG. 6a, first row, second column). Session-cluster VL-25 also shows a large contribution in the page view category "Recent activity" (FIG. 6b, tenth row, second column), which corresponds to checking the recent activity on the Example Service website (i.e. recently added photos, albums, etc.). Indeed, aggregators e.g., reddit.com, are used to get an overview on recent events on external websites, e.g., Example Service. Thus, users that have a source domain categorized as "Aggregator" are more likely interested in browsing recently added photos, albums, etc.

Session-cluster VL-33 shows a large contribution in the source category "Mail" (FIG. 6a, third row, forth column). Session-cluster VL-33 also shows a large contribution in the page view categories "Manage friends" and "Add friend" (FIG. 6b, first and eighth rows, respectively, forth column), which corresponds to social actions, including: the set of all pages related to adding, editing or removing information about the contacts in Example Service; and the page where users are asked for confirmation when adding a contact. Manual inspection of the sessions suggests that the traffic in this cluster mainly derives from accepted invitation sent to email contacts. Thus, users that have a source domain categorized as "Mail" are more likely interested in performing a social function, e.g., managing and adding friends.

Session-cluster VL-9 shows a large contribution in the source category "Search" (FIG. 6a, sixth row, seventh column). Session-cluster VL-9 also shows a large contribution in the page view categories "Search CC photos" and "Search photos" (FIG. 6b, fifth and seventh rows, respectively, seventh column), which supports the theory that users are migrating the search task to Example Service in order to take advantage of the image search features, as for instance filtering photos by Creative Commons (CC) license or tags. Thus, users that have a source domain categorized "Search" are more likely interested in further searching.

Customizing a User's Experience

Figure 7:
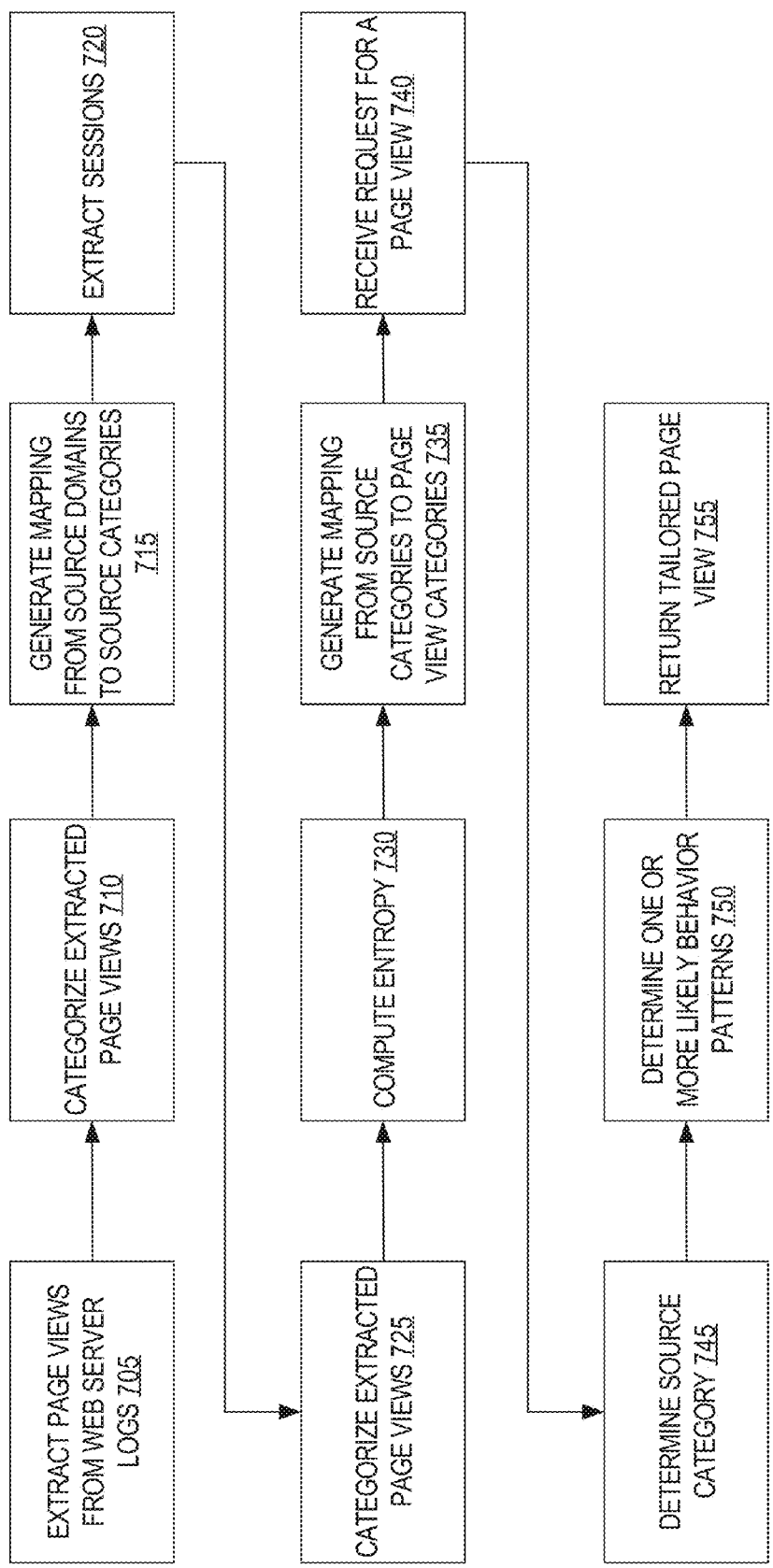
FIG. 7 is a flowchart that illustrates customizing a user's experience based on the source domain, according to one embodiment.

FIG. 7 is a flowchart that illustrates customizing a user's experience based on the source domain, according to one embodiment. While FIG. 7 illustrates steps according to one embodiment, other embodiments may omit, add to, reorder, and/or modify any of the steps shown.

In step 705, page view records are extracted from logs generated by one or more web servers. The page view records that originate from certain geographic regions or from automated web-crawlers are filtered out.

In step 710, the extracted page view records are assigned to page view categories. In one embodiment, the page view categorization is based on the layout of the page view and/or the content the user is presented within a given page.

In step 715, a mapping is generated from source domains to source categories. In one embodiment, the source domains are mapped to a source category based on Yahoo! Directory 3 and manual categorizations.

In step 720, sessions are extracted from the page view records. The sessions are determined based on the user identifier, the interval between timestamps in page view records, and the source domains.

In step 725, the session-clusters are generated according to the embodiment illustrated in FIG. 4.

In step 730, each session-clusters' entropy is computed. The session-clusters with the highest entropy are selected to be used in step 735, whereas the rest are discarded.

In step 735, a mapping is generated from source categories to page view categories, or behavior patterns, using the session-clusters with the highest entropy in step 730. First, each source category, of a set of source categories, is mapped to the session-cluster with the highest contribution in that source category. Second, each page view category, or behavior pattern, is mapped to the session-cluster with the highest contribution in that page view category. Third, one or more source categories in the first mapping, are associated with at least one page view category in the second mapping, such that each mapped source category and page view category share the same session-cluster in the first two mappings.

In step 740, the web server receives a request for a page view by a user, which includes a source domain.

In step 745, the web server determines which source category the source domain belongs to.

In step 750, the web server determines one or more behavior patterns the user will likely engage in based on the third mapping created in step 735, which maps a source domain to one or more behavior patterns.

In step 755, the web server returns a tailored page view which includes elements that correspond with the one or more behavior patterns the user is likely to engage in, based on the determined one or more behavior patterns in step 750.

The following are examples of possible mapping and tailored pages; however, these are merely examples of a vast number of possible mappings and tailored pages. The foregoing examples are not intended to be limiting in any way. If the user requests a page view for a single image, with a source domain categorized as news, then the user may be presented with images from the same group. If the user requests a page, and the source domain is categorized as "aggregator," then the user may be presented with recently added images. If the user requests a page, and the source domain is categorized as "mail," then the user may be presented with social features from both page categories "manage friends" and "add a friend." Thus the user may be presented with components in the page to manage friends, e.g., a "follow" link, a view profile link, information regarding the user, or many other social features or components. If the user requests a page, and the source domain is categorized as "search," then the user may be presented with a search box, photos that have the same keywords as the terms searched for in the source domain. Furthermore, the search box could be accentuated to draw the users' attention to the search feature.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
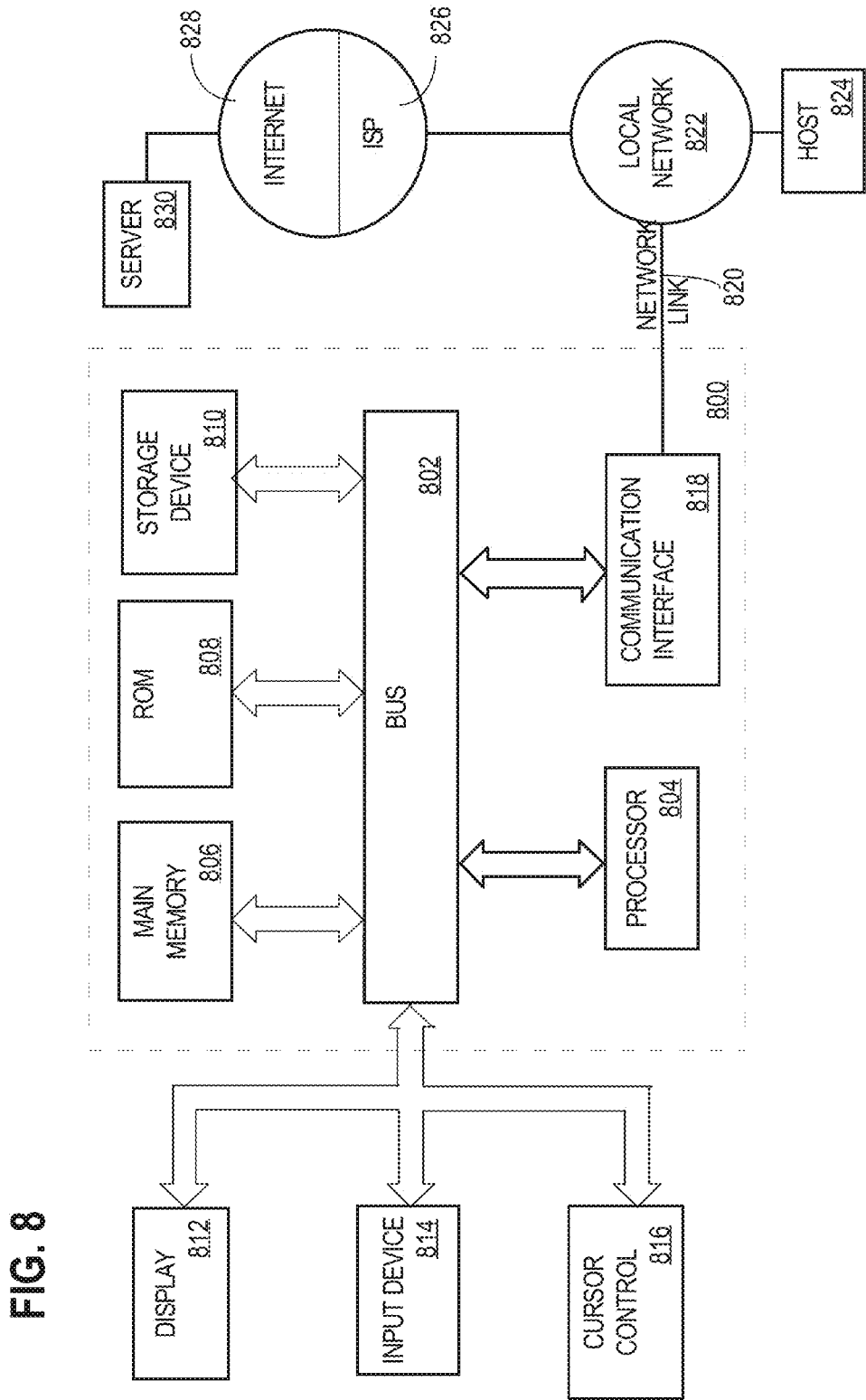
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    establishing a plurality of source categories, wherein the plurality of source categories includes a particular source category to which a plurality of source domains are mapped;
    based on behavior, at a site at which users may engage in any of a plurality of behavior patterns, of users that visit the site from different source domains, establishing a mapping between source categories to which those source domains belong and behavior patterns;
    in response to a user visiting the site, performing the steps of:
        determining a source domain from which the user is visiting the site;
        determining that the source domain is mapped to the particular source category;
        based, at least in part, on the particular source category, selecting a behavior pattern, of the plurality of behavior patterns, in which the user is likely to engage; and
        customizing the user's experience at the site based, at least in part, on the selected behavior pattern;
    wherein the method is performed by one or more special-purpose computing devices.

2. The method of claim 1, wherein prior to the user visiting the site:
    obtaining a dataset based, at least in part, on one or more logs that indicate page views of pages from the site;

identifying a plurality of sessions that are reflected in the dataset;
generating a mapping from the source domain to the selected behavior pattern based, at least in part, on (a) a mapping from the source domain to the particular source category and (b) a mapping form the particular source category to the selected behavior pattern;
wherein the step of selecting the behavior pattern is based, at least in part, on the mapping from the source domain to the selected behavior pattern.

3. The method of claim 2, wherein:
the mapping from the particular source category to the selected behavior pattern is based, at least in part, on:
the particular source category associated with a session-cluster, wherein the session-cluster comprises one or more sessions of the plurality of sessions; and
the selected behavior pattern associated with the session-cluster.

4. The method of claim 3, wherein the particular source category is associated with the session-cluster based, at least in part, on (a) the session-cluster's contribution in the particular source category and (b) the session-cluster's contribution in the selected behavior pattern.

5. The method of claim 2, wherein:
the indicated page views each comprise one or more fields; and
obtaining the dataset, comprises filtering the indicated page views based, at least in part, on contents of at least one of the one or more fields of each of the indicated page views.

6. The method of claim 2, wherein the mapping from the source domain to the particular source category is established manually.

7. The method of claim 2, further comprising:
assigning one or more of the indicated page views to a page view category based, at least in part, on layout of the indicated page views;
wherein the selected behavior pattern corresponds to the page view category.

8. The method of claim 3, further comprising:
generating the session-cluster from one or more sessions of the plurality of sessions based, at least in part, on canopy clustering.

9. The method of claim 3, further comprising:
generating the session-cluster from one or more sessions of the plurality of sessions based, at least in part, on K-means clustering.

10. The method of claim 3, further comprising:
determining an entropy for the session-cluster; and
wherein the mapping from the particular source category to the selected behavior pattern is based, at least in part, on the entropy for the session-cluster being greater than a particular threshold.

11. One or more non-transitory storage media storing instructions which, when executed by one or more computing devices, cause the one or more computing devices to perform:
establishing a plurality of source categories, wherein the plurality of source categories includes a particular source category to which a plurality of source domains are mapped;
based on behavior, at a site at which users may engage in any of a plurality of behavior patterns, of users that visit the site from different source domains, establishing a mapping between source categories to which those source domains belong and behavior patterns;
in response to a user visiting the site, performing the steps of:
determining a source domain from which the user is visiting the site;
determining that the source domain is mapped to the particular source category;
based, at least in part, on the particular source category, selecting a behavior pattern, of the plurality of behavior patterns, in which the user is likely to engage; and
customizing the user's experience at the site based, at least in part, on the selected behavior pattern.

12. The non-transitory storage media of claim 11, wherein the instructions further cause the one or more computing devices to perform the steps of, prior to the user visiting the site:
obtaining a dataset based, at least in part, on one or more logs that indicate page views of pages from the site;
identifying a plurality of sessions that are reflected in the dataset;
generating a mapping from the source domain to the selected behavior pattern based, at least in part, on (a) a mapping from the source domain to the particular source category and (b) a mapping form the particular source category to the selected behavior pattern;
wherein the step of selecting the behavior pattern is based, at least in part, on the mapping from the source domain to the selected behavior pattern.

13. The non-transitory storage media of claim 12, wherein:
the mapping from the source category to the selected behavior pattern is based, at least in part, on:
the source category associated with a session-cluster, wherein the session-cluster comprises one or more sessions of the plurality of sessions; and
the selected behavior pattern associated with the session-cluster.

14. The non-transitory storage media of claim 13, wherein the particular source category is associated with the session-cluster based, at least in part, on (a) the session-cluster's contribution in the particular source category and (b) the session-cluster's contribution in the selected behavior pattern.

15. The non-transitory storage media of claim 12, wherein:
the indicated page views each comprise one or more fields; and
obtaining the dataset, comprises filtering the indicated page views based, at least in part, on contents of at least one of the one or more fields of each of the indicated page views.

16. The non-transitory storage media of claim 12, wherein the mapping from the source domain to the particular source category is established manually.

17. The non-transitory storage media of claim 12, wherein the instructions further cause the one or more computing devices to perform the steps of:
assigning one or more of the indicated page views to a page view category based, at least in part, on layout of the indicated page views;
wherein the selected behavior pattern corresponds to the page view category.

18. The non-transitory storage media of claim 13, wherein the instructions further cause the one or more computing devices to perform the steps of:
generating the session-cluster from one or more sessions of the plurality of sessions based, at least in part, on canopy clustering.

19. The non-transitory storage media of claim 13, wherein the instructions further cause the one or more computing devices to perform the steps of:
   generating the session-cluster from one or more sessions of the plurality of sessions based, at least in part, on K-means clustering.

20. The non-transitory storage media of claim 13, wherein the instructions further cause the one or more computing devices to perform the steps of:
   determining an entropy for the session-cluster; and
   wherein the mapping from the particular source category to the selected behavior pattern is based, at least in part, on the entropy for the session-cluster being greater than a particular threshold.

\* \* \* \* \*